US012711848B2

(12) United States Patent
Xu

(10) Patent No.: US 12,711,848 B2
(45) Date of Patent: Aug. 18, 2026

(54) ANTI-LOST METHOD AND SYSTEM, READABLE STORAGE MEDIUM, CLOUD SERVER AND MOBILE TERMINAL

(71) Applicant: BOE TECHNOLOGY GROUP CO., LTD., Beijing (CN)

(72) Inventor: Jingtao Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1179 days.

(21) Appl. No.: 17/764,250

(22) PCT Filed: Jun. 25, 2021

(86) PCT No.: PCT/CN2021/102378

§ 371 (c)(1),
(2) Date: Mar. 28, 2022

(87) PCT Pub. No.: WO2022/267006

PCT Pub. Date: Dec. 29, 2022

(65) Prior Publication Data

US 2026/0120552 A1 Apr. 30, 2026

(51) Int. Cl.
*G06K 9/00* (2022.01)
*G06V 20/52* (2022.01)
(Continued)

(52) U.S. Cl.
CPC ......... *G08B 21/0266* (2013.01); *G06V 20/53* (2022.01); *G06V 40/161* (2022.01);
(Continued)

(58) Field of Classification Search
CPC .. G08B 21/0266; G08B 21/182; G08B 25/14; G06V 20/53; G06V 40/161; G06V 40/172
See application file for complete search history.

(56) References Cited

U.S. PATENT DOCUMENTS 10,120,354 B1 * 11/2018 Rolston ............... H04L 12/2816
10,943,456 B1 * 3/2021 Carbonell ............... H04W 4/90
2010/0216487 A1 8/2010 Yamaguchi

FOREIGN PATENT DOCUMENTS

CN 101390136 A 3/2009
CN 107169461 A 9/2017
(Continued)

OTHER PUBLICATIONS

China Patent Office, CN202180001651.0 First Office Action issued on Dec. 18, 2024.
(Continued)

*Primary Examiner* — An T Nguyen
(74) *Attorney, Agent, or Firm* — HOUTTEMAN LAW LLC

(57) ABSTRACT

Disclosed are an anti-lost method, a computer-readable storage medium, a cloud server, a mobile terminal, and an anti-lost system. The anti-lost method includes: acquiring reference face image of a person under guardianship and reference face image of at least one guardian associated with the person under guardianship; acquiring image of a monitored area; determining, based on the image of the monitored area, the reference face image of the person under guardianship, and the reference face image of the guardian, physical locations of the person under guardianship and each guardian in the monitored area; determining, according to the physical locations of the person under guardianship and each guardian in the monitored area, a physical distance between the person under guardianship and each guardian, and determining whether minimum physical distance is greater than a preset threshold; and emitting warning signal when the minimum physical distance is larger than the preset threshold.

18 Claims, 6 Drawing Sheets

(51) Int. Cl.

| | |
|---|---|
| ***G06V 40/16*** | (2022.01) |
| ***G08B 21/02*** | (2006.01) |
| ***G08B 21/18*** | (2006.01) |
| ***G08B 25/14*** | (2006.01) |

(52) U.S. Cl.

CPC ......... *G06V 40/172* (2022.01); *G08B 21/182* (2013.01); *G08B 25/14* (2013.01)

(56) References Cited

FOREIGN PATENT DOCUMENTS

| | | | |
|---|---|---|---|
| CN | 108764191 | A | 11/2018 |
| CN | 110298293 | A | 10/2019 |
| CN | 110718041 | A | 1/2020 |
| CN | 110782627 | A | 2/2020 |
| CN | 111008631 | A | 4/2020 |
| CN | 111079512 | A | 4/2020 |
| CN | 111210590 | A | 5/2020 |
| CN | 111292502 | A | 6/2020 |
| CN | 111586369 | A | 8/2020 |
| CN | 111753611 | A | 10/2020 |
| CN | 112070011 | A | 12/2020 |
| CN | 112288997 | A | 1/2021 |
| CN | 112562260 | A | 3/2021 |
| JP | 2018201176 | A | 12/2018 |
| KR | 20200067654 | A | 6/2020 |

OTHER PUBLICATIONS

China Patent Office, Second Office Action, Jul. 11, 2025, for corresponding CN application No. 202180001651.0.

Zhang, et al., “A Visual-Inertial Collaborative Indoor Localization Method for Multiple Moving Pedestrian Targets”, Geomatics and Information Science of Wuhan University, May 2021,46(5):672-680, DOI: 10.13203/j.whugis20200454; China. (English Abstract).

* cited by examiner

ANTI-LOST METHOD AND SYSTEM, READABLE STORAGE MEDIUM, CLOUD SERVER AND MOBILE TERMINAL

CROSS-REFERENCE TO RELATED APPLICATION

This is a National Phase Application filed under 35 U.S.C. 371 as a national stage of PCT/CN2021/102378, filed on Jun. 25, 2021.

TECHNICAL FIELD

The present disclosure relates to the field of display technology, and specifically relates to an anti-lost method, a computer-readable storage medium, a cloud server, a mobile terminal, and an anti-lost system.

BACKGROUND

In places with a crowd, such as various parks, squares, malls and the like, a ward (or person under guardianship), such as a child, an old person, or the like tends to be lost, and needs to be found in time.

SUMMARY

The present disclosure provides an anti-lost method, a computer-readable storage medium, a cloud server, a mobile terminal, and an anti-lost system.

In a first aspect, the present disclosure provides an anti-lost method, including:

acquiring a reference face image of a person under guardianship and a reference face image of at least one guardian associated with the person under guardianship;

acquiring an image of a monitored area;

determining, based on the image of the monitored area, the reference face image of the person under guardianship, and the reference face image of the at least one guardian, physical locations of the person under guardianship and the at least one guardian in the monitored area;

determining, according to the physical locations of the person under guardianship and the at least one guardian in the monitored area, a physical distance between the person under guardianship and each of the at least one guardian, and determining whether a minimum physical distance is greater than a preset threshold; and emitting a warning signal in a case where the minimum physical distance is larger than the preset threshold.

In some embodiments, the determining, based on the image of the monitored area, the reference face image of the person under guardianship, and the reference face image of the at least one guardian, physical locations of the person under guardianship and each guardian in the monitored area includes:

performing face detection on the image of the monitored area to obtain face image of each person in the monitored area;

determining, according to the face image of each person in the monitored area, the reference face image of the person under guardianship and the reference face image of the at least one guardian, whether the person under guardianship and the guardian are present in the monitored area;

acquiring, in a case where the person under guardianship and the guardian are present in the monitored area, body external frames of the person under guardianship and each guardian; and determining, according to image positions of the body external frames of the person under guardianship and the guardian in the image of the monitored area, physical locations of the guardian and the person under guardianship in the monitored area.

In some embodiments, the acquiring the body external frames of the person under guardianship and the at least one guardian includes:

performing body detection on the image of the monitored area to obtain a body external frame of each person in the monitored area;

taking a body external frame having a largest overlapping area with a face frame of the person under guardianship as the body external frame of the person under guardianship; and for the at least one guardian, taking a body external frame having a largest overlapping area with a face frame of the guardian as the body external frame of the guardian.

In some embodiments, the acquiring the reference face image of the person under guardianship and the reference face image of at least one guardian associated with the person under guardianship specifically includes:

acquiring body images of a plurality of persons at an entrance of the monitored area; and acquiring the reference face image of the person under guardianship and the reference face image of the at least one guardian associated with the person under guardianship from the body images of the plurality of persons.

In some embodiments, the acquiring the reference face image of the person under guardianship and the reference face image of at least one guardian associated with the person under guardianship from the body images of the plurality of persons specifically includes:

determining, according to the body images of the plurality of persons, feature information of each of the plurality of persons, wherein the feature information includes posture information and/or clothing information;

determining, according to the feature information of each of the plurality of persons, whether a group of associated persons are present in the plurality of persons;

determining, in a case where a group of associated persons are present in the plurality of persons, whether the person under guardianship and the at least one guardian are present in the group of associated persons; and performing, in a case where the person under guardianship and the at least one guardian are present in the group of associated persons, face detection on the person under guardianship and the at least one guardian to obtain the reference face image of the person under guardianship and the at least one reference face image of the guardian.

In some embodiments, before acquiring the reference face image of the person under guardianship and the reference face image of the at least one guardian associated with the person under guardianship, the method further includes: receiving and storing registration information uploaded by a mobile terminal, wherein the registration information includes: reference face images of a plurality of persons; and the acquiring the reference face image of the person under guardianship and the reference face image of the at least one guardian associated with the person under guardianship specifically includes: selecting, in response to a first selection instruction, reference face images of a corresponding person under guardianship and at least one guardian associated with the person under guardianship from the prestored registration information.

In some embodiments, the warning signal is sent to the mobile terminal.

In some embodiments, after emitting the warning signal, the anti-lost method further includes:

sending an instruction input request to the mobile terminal to cause the mobile terminal to output instruction request information, wherein the instruction request information is configured to request a user to input a navigation instruction or an abandon instruction;

sending, in a case where the navigation instruction is received, navigation information to the mobile terminal; wherein the navigation information includes route information between the person under guardianship and the guardian.

In some embodiments, before acquiring the reference face image of the person under guardianship and the reference face image of the at least one guardian associated with the person under guardianship, the method further includes: receiving and storing registration information uploaded by a mobile terminal, wherein the registration information includes: reference face images of a plurality of persons; and the acquiring the reference face image of the person under guardianship and the reference face image of the at least one guardian associated with the person under guardianship specifically includes:

selecting, in response to a second selection instruction, at least reference face image of a corresponding person under guardianship from the prestored registration information;

acquiring body images of a plurality of persons at an entrance of the monitored area; and acquiring, according to the reference face image of the person under guardianship, the reference face image of the at least one guardian associated with the person under guardianship from the body images of the plurality of persons acquired at the entrance of the monitored area.

In some embodiments, the acquiring, according to the reference face image of the person under guardianship, the reference face image of the at least one guardian associated with the person under guardianship from the body images of the plurality of persons acquired at the entrance of the monitored area specifically includes:

determining, according to the reference face image of the person under guardianship and the body images of the plurality of persons, feature information of the person under guardianship and feature information of each of the plurality of persons, wherein the feature information includes posture information and/or clothing information;

acquiring, according to the feature information of the person under guardianship and the feature information of each of the plurality of persons, a group of associated persons at the entrance of the monitored area, wherein the group of associated persons includes the person under guardianship and the at least one guardian; and acquiring a face image of the at least one guardian in the group of associated persons as the reference face image of the at least one guardian.

In some embodiments, the preset threshold is related to a crowd density in the monitored area.

In a second aspect, an embodiment of the present disclosure further provides a computer-readable storage medium having a computer program stored thereon which, when executed by a processor, causes the anti-lost method as described above to be implemented.

In a third aspect, an embodiment of the present disclosure further provides a cloud server, including a memory and a processor, wherein the memory has a computer program stored thereon which, when executed by a processor, causes the anti-lost method as described above to be implemented.

In a fourth aspect, an embodiment of the present disclosure further provides a mobile terminal, including a memory and a processor, wherein the memory has a computer program stored thereon which, when executed by the processor, causes the following steps to be implemented:

sending, in response to a warning initiation instruction, a starting signal to a cloud server so that the cloud server, in response to the starting signal, implements the anti-lost method as described above; and outputting corresponding warning information in response to the warning signal.

In some embodiments, when executed by the processor, the computer program further causes the following step to be implemented:

acquiring registration information and uploading the registration information to the cloud server; wherein the registration information includes: reference face images of a plurality of persons.

In some embodiments, when executed by the processor, the computer program further causes the following steps to be implemented:

outputting, in response to an instruction input request sent from the cloud server, instruction request information to request a user to input a navigation instruction or an abandon instruction;

sending, when the navigation instruction is received, the navigation instruction to the cloud server so that the cloud server generates navigation information in response to the navigation instruction; and receiving and displaying the navigation information.

In a fifth aspect, an embodiment of the present disclosure further provides an anti-lost system, including: a cloud server as described above and a mobile terminal as described above.

BRIEF DESCRIPTION OF DRAWINGS

Accompanying drawings are provided for further understanding of the present disclosure and constitute a part of the specification. Hereinafter, these drawings are intended to explain the present disclosure together with the following specific embodiments, but should not be considered to limit the present disclosure. In the drawings.

DETAIL DESCRIPTION OF EMBODIMENTS

To make the objects, technical solutions and advantages of the present disclosure clearer, the technical solutions in the embodiments of the present disclosure will now be described clearly and completely with reference to the accompanying drawings of the embodiments of the present disclosure. Obviously, the described embodiments are merely a part, not all, of the embodiments of the present disclosure. Based on the described embodiments of the present disclosure, all the other embodiments obtained by those ordinary skilled in the art without any creative labor fall within the protection scope of the present disclosure.

Figure 1:
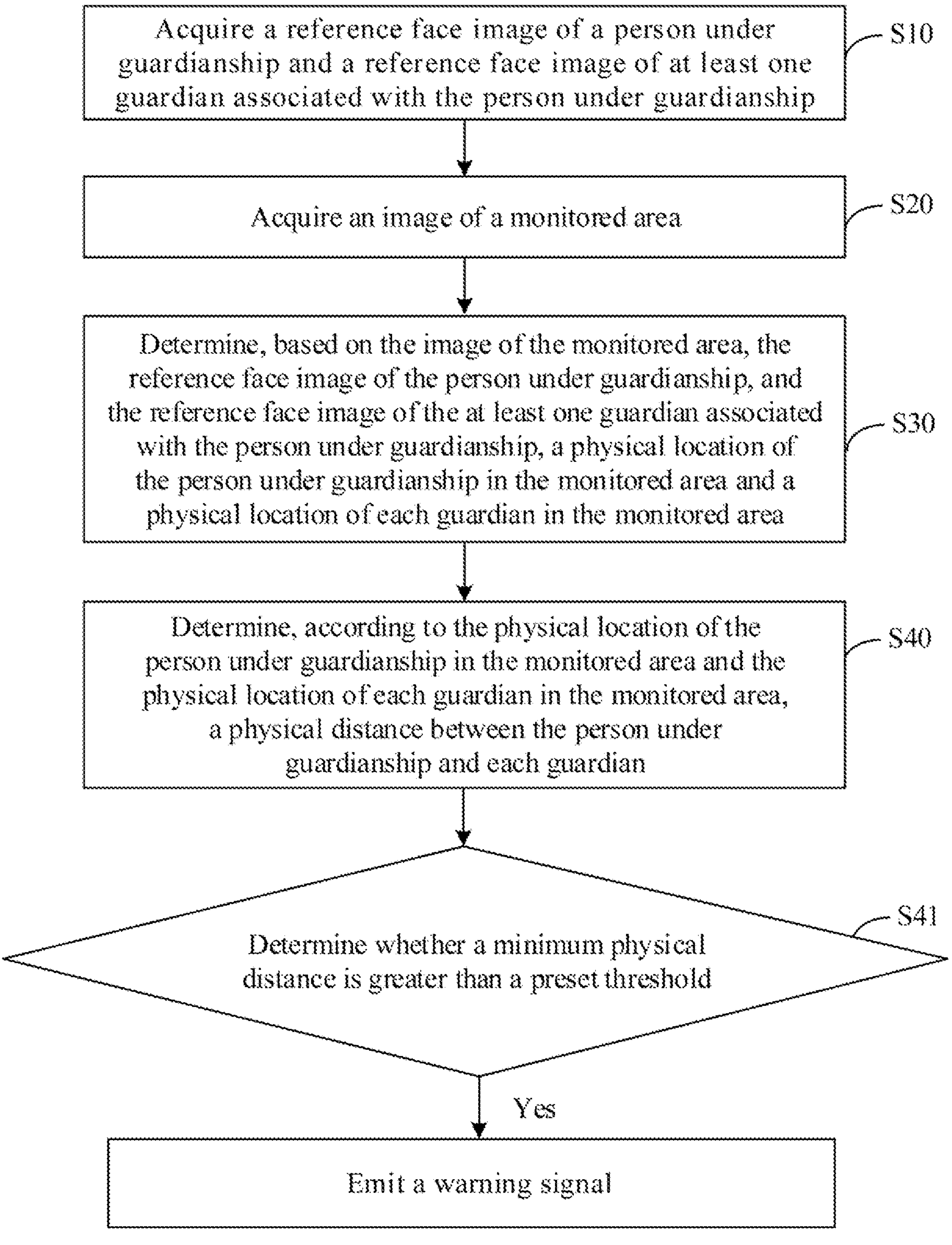
FIG. 1 is a flowchart of an anti-lost method according to some embodiments of the present disclosure.

FIG. 1 is a flowchart of an anti-lost method that is applicable to a cloud server, according to some embodiments of the present disclosure. As shown in FIG. 1, the anti-lost method includes the following steps S10 to S41.

Step S10 includes acquiring a reference face image of a person under guardianship and a reference face image of at least one guardian associated with the person under guardianship.

The person under guardianship may refer to: a child, an old person, a person with mental retardation, or any other person who needs to be under guardianship. The guardian associated with the person under guardianship refers to a person who enters a monitored area together with the person under guardianship and can attend to the person under guardianship. The monitored area may be a place including a park, a square, a mall or the like.

The reference face image of the person under guardianship (or guardian) refers to a face image of the person under guardianship (or guardian) before she/he enters into the monitored area. The reference face image of the person under guardianship (or guardian) may be captured by an image capturing device at an entrance of the monitored area and uploaded to a cloud server; or may be acquired by a mobile terminal (such as a mobile phone) and uploaded to a cloud server; or may be acquired from a database. For example, an App associated with a database in which reference face images of a plurality of persons are stored is installed on a mobile terminal, and after the App on the mobile terminal acquires identity information of the person under guardianship (or guardian), the database sends the reference face image corresponding to the identity information of the guardian (or guardian) to the cloud server. There may be one or more guardians.

Step S20 includes acquiring an image of a monitored area.

The image of the monitored area may be captured by an image capturing device in the monitored area and then uploaded to a cloud server by the image capturing device. The image capturing device may include a plurality of cameras each having a certain monitoring range, and images captured by the plurality of cameras collectively form an image of the whole monitored area.

The image capturing device in the monitored area may capture the image of the monitored area in real time, and the cloud server may acquire the captured the image from the image capturing device in real time or at a certain frequency. In an example, the cloud server receives images of the monitored area once each time the image capturing device acquires 5 frames of images of the monitored area. Each time the cloud server acquires the images, the following Steps S30 to S41 are performed.

Step S30 includes determining, based on the image of the monitored area, the reference face image of the person under guardianship, and the reference face image of the at least one guardian associated with the person under guardianship, a physical location of the person under guardianship in the monitored area and a physical location of each guardian in the monitored area.

The cloud server may perform face detection on the image of the monitored area to obtain face images of all people appearing in the monitored area, and compare the face images with the reference face image of the person under guardianship and the reference face image of the guardian to determine which person is the person under guardianship and which person is the guardian, in the monitored area.

Step S40 includes determining, according to the physical location of the person under guardianship in the monitored area and the physical location of each guardian in the monitored area, a physical distance between the person under guardianship and each guardian.

The "physical distance" between the person under guardianship and the guardian refers to a distance between the physical location of the person under guardianship in the monitored area and the physical location of the guardian in the monitored area.

Step S41 includes determining whether a minimum physical distance (i.e., minimum of all physical distances) is greater than a preset threshold; and emitting a warning signal if the minimum physical distance is greater than the preset threshold. The minimum physical distance refers to a distance between the physical location of the person under guardianship and the physical location of a guardian among all guardians closest to the person under guardianship.

The cloud server may acquire the preset threshold prior to Step S30. Optionally, the preset threshold is related to a density of the crowd (hereinafter "crowd density") of the monitored area. For example, the preset threshold is substantially positively correlated to the crowd density in the monitored area. In some examples, the preset threshold may be input to a mobile terminal by a user, and then sent to the cloud server from the mobile terminal. For example, when the monitored area has a relatively large crowd density, the user may set the preset threshold to a smaller value, for example, 5 m; and when the monitored area has a relatively small crowd density, the user may set the preset threshold to a larger value, for example, 10 m or 20 m. In other examples, the preset threshold may be determined by the cloud server. For example, the cloud server may determine the crowd density of the monitored area according to images of the monitored area, and set the preset threshold according to the crowd density of the monitored area. For example, when the detected crowd density of the monitored area is greater than or equal to 1 person/2 $m^2$, the preset threshold is set to 5 m; when the crowd density of the monitored area is smaller than 1 person/2 $m^2$ and greater than 1 person/10 $m^2$, the preset threshold is set to 10 m; and when the crowd density of the monitored area is smaller than or equal to 1 person/10 $m^2$, the preset threshold is set to 15 m.

For example, assuming that the person under guardianship is child A, and the guardian associated with child A is adult B, if the physical distance between child A and adult B is greater than the preset threshold, a warning signal is emitted. For another example, assuming that the person under guardianship is child A, and the guardians associated with child A are adults B and C, if the physical distance between child A and adult B is greater than the physical distance between child A and adult C, and the physical distance between child A and adult C is greater than the preset threshold, a warning signal is emitted.

The warning signal may be sent to a mobile terminal of the guardian from the cloud server, or may be sent in other forms, such as sent as a broadcast.

In the anti-lost method according to the embodiments of the present disclosure, by determining, based on the image of the monitored area, the reference face image of the person under guardianship, and the reference face image(s) of the guardian(s) associated with the person under guardianship, a physical location of the person under guardianship in the monitored area and a physical location of the guardian in the monitored area, and by emitting a warning signal to alert the guardian when the physical distance between the person under guardianship and the closest guardian exceeds the preset threshold, the loss probability of the person under guardianship can be reduced, and the person under guardianship does not need to wear any device.

Figure 2:
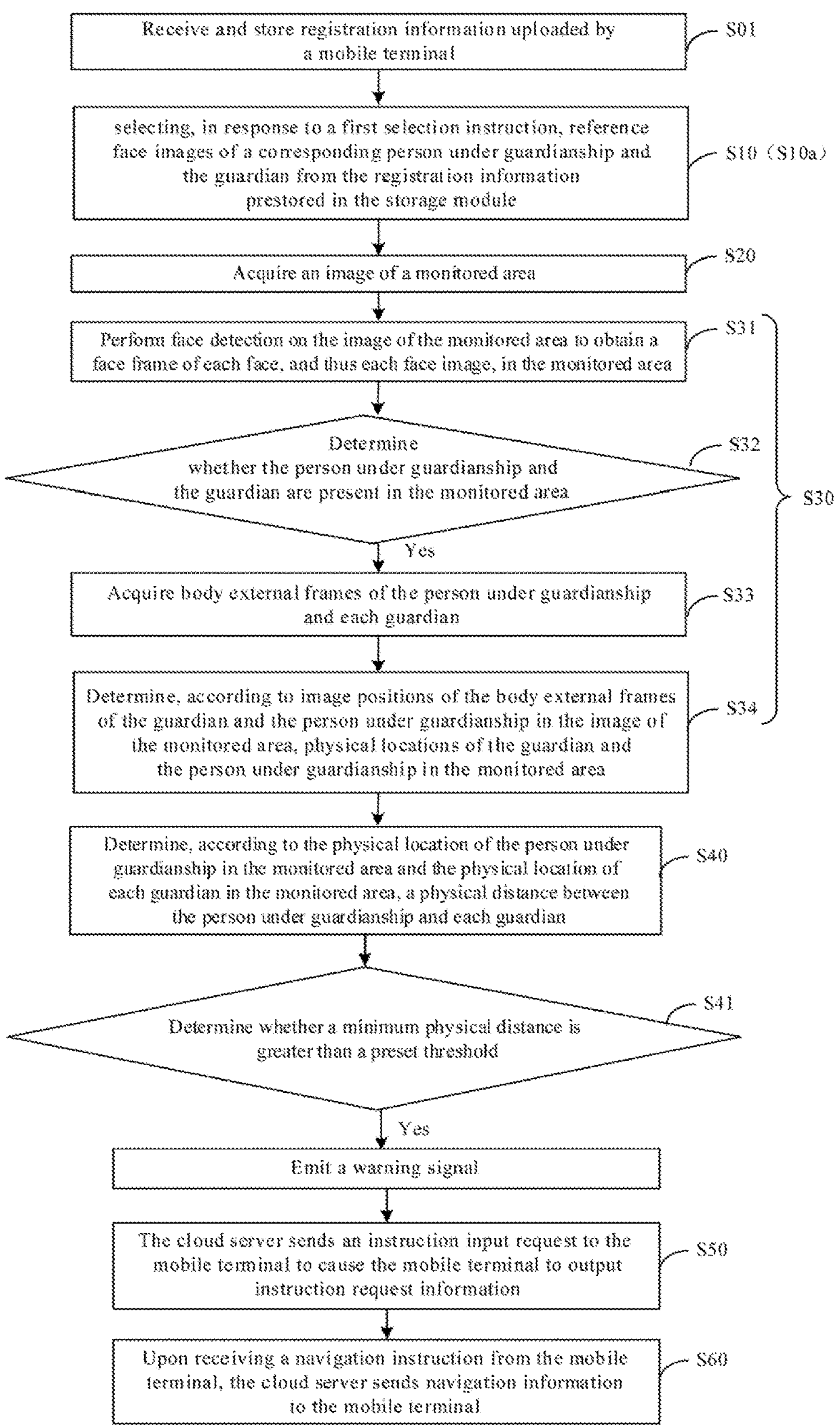
FIG. 2 is a schematic diagram of an anti-lost method according to some other embodiments of the present disclosure.

FIG. 2 is a schematic diagram of an anti-lost method according to some other embodiments of the present disclosure, and shows a specific implementation of the anti-lost method of FIG. 1. As shown in FIG. 2, the anti-lost method includes the following steps.

Step S01 includes receiving and storing registration information uploaded by a mobile terminal. The registration information includes: reference face images of a plurality of persons. The plurality of persons may include a guardian and a person under guardianship. The reference face image of each person in the registration information may include: a recent face image of each person.

For example, a user (who may be a holder of the mobile terminal as well as a guardian) firstly registers as an administrator on the mobile terminal, during which identity information of the user himself/herself, such as a name, an ID number, a telephone number, a reference face image, or the like, may be input. The user may further add identity information of the person under guardianship, such as a name, an ID number and a reference face image, into the mobile terminal. The mobile terminal uploads the registration information (i.e., identity information of the guardian and the person under guardianship) to a storage module of the cloud server for storage.

It should be noted that the registration information may include reference face images of a plurality of guardians. For example, after the user registers as an administrator on the mobile terminal, in addition to the identity information of the person under guardianship, identity information of other guardians may be added. In addition, the user as the administrator may further manage, for example, delete, the identity information of each person as added.

Step S10 includes acquiring a reference face image of a person under guardianship and a reference face image of at least one guardian associated with the person under guardianship.

In some embodiments, Step S10 may specifically include: Step S10*a*, selecting, in response to a first selection instruction, reference face images of a corresponding person under guardianship and the guardian from the registration information prestored in the storage module.

The user may select the guardian and the person under guardianship to be monitored from the mobile terminal, and the mobile terminal generates the first selection instruction according to the selection of the user and uploads the first selection instruction to the cloud server. The cloud server, according to the first selection instruction, selects corresponding reference face images of the person under guardianship and the guardian from the storage module.

Step S20 includes acquiring an image of a monitored area.

Step S30 includes determining, based on the image of the monitored area, the reference face image of the person under guardianship, and the reference face image of each guardian associated with the person under guardianship, a physical location of the person under guardianship in the monitored area and a physical location of each guardian in the monitored area.

Specifically, Step S30 may include Steps S31 to S33.

Step S31 includes performing face detection on the image of the monitored area to obtain a face frame of each face, and thus each face image, in the monitored area.

The specific manner of face detection is not limited in the embodiments of the present disclosure, as long as each face image can be acquired.

Step S32 includes determine, according to each face image in the monitored area, the reference face image of the person under guardianship and the reference face image of each guardian, whether the person under guardianship and the guardian are present in the monitored area. When the person under guardianship and the guardian are present in the monitored area, Step S33 is executed.

Step S33 includes acquiring body external frames of the person under guardianship and each guardian. In some embodiments, Step S33 may specifically include steps S331 to S332.

Step S331 includes performing body detection on the image of the monitored area to obtain a body external frame of each person in the monitored area.

The specific manner of body detection is not limited in the embodiments of the present disclosure, as long as the body external frame of each person can be detected. The body external frame refers to a rectangular frame capable of surrounding a body image.

Step S332 includes taking a body external frame having a largest overlapping area with a face frame of the person under guardianship as the body external frame of the person under guardianship; and for any guardian, taking a body external frame having a largest overlapping area with a face frame of the guardian as the body external frame of the guardian.

It will be appreciated that for the same person, the face frame is located within a range of the body external frame, and therefore, the body external frame of the person under guardianship and the body external frame of the guardian can be determined by detecting an overlapping area of each body external frame with the face frame of the person under guardianship, and an overlapping area of each body external frame with the face frame of the guardian.

Step S34 includes determining, according to image positions of the body external frames of the guardian and the person under guardianship in the image of the monitored area, physical locations of the guardian and the person under guardianship in the monitored area.

The image position of the body external frame in the image of the monitored area may refer to an image position of a reference point of the body external frame in the image of the monitored area, and the reference point of the body external frame may refer to a position at a lower left corner of the body external frame.

In some embodiments, Step S34 specifically includes: determining, according to a preset position mapping relationship and the image position of the guardian, the physical location of the guardian; and determining, according to the position mapping relationship and the image position of the person under guardianship, the physical location of the person under guardianship.

The position mapping relationship is: a mapping relationship between image positions of sample points in the image of the monitored area and physical locations of the sample points in the monitored area.

Step S40 includes determining, according to the physical location of the person under guardianship in the monitored area and the physical location of each guardian in the monitored area, a physical distance between the person under guardianship and each guardian.

Step S41 includes determining whether the minimum physical distance (i.e., minimum of all physical distances) is greater than a preset threshold, and emitting a warning signal if the minimum physical distance is greater than the preset threshold.

The cloud server may send the warning signal to a mobile terminal. In an example, the warning signal may be: a signal including warning information and position information of the person under guardianship. After receiving the warning signal, the mobile terminal may output corresponding warning information and position information. Illustratively, the warning information and the position information are displayed in text.

In some embodiments, after Step S41, the method further includes the following Steps S50 to S60.

At Step S50, the cloud server sends an instruction input request to the mobile terminal to cause the mobile terminal to output instruction request information. The instruction request information is configured to request a user to input a navigation instruction or an abandon instruction. Illustratively, the instruction request information is output in a text form and/or a speech form. For example, the instruction request information is "Do you need navigation?". When the user inputs a navigation instruction or an abandon instruction to the mobile terminal, the mobile terminal sends the received navigation instruction or the abandon instruction to the cloud server.

At Step S60, upon receiving the navigation instruction from the mobile terminal, the cloud server sends navigation information to the mobile terminal. The navigation information includes route information between the person under guardianship and the guardian so that the user can quickly find the person under guardianship according to the navigation information. When the cloud server receives an abandon instruction from the mobile terminal, the navigation information is not sent.

Figure 3:
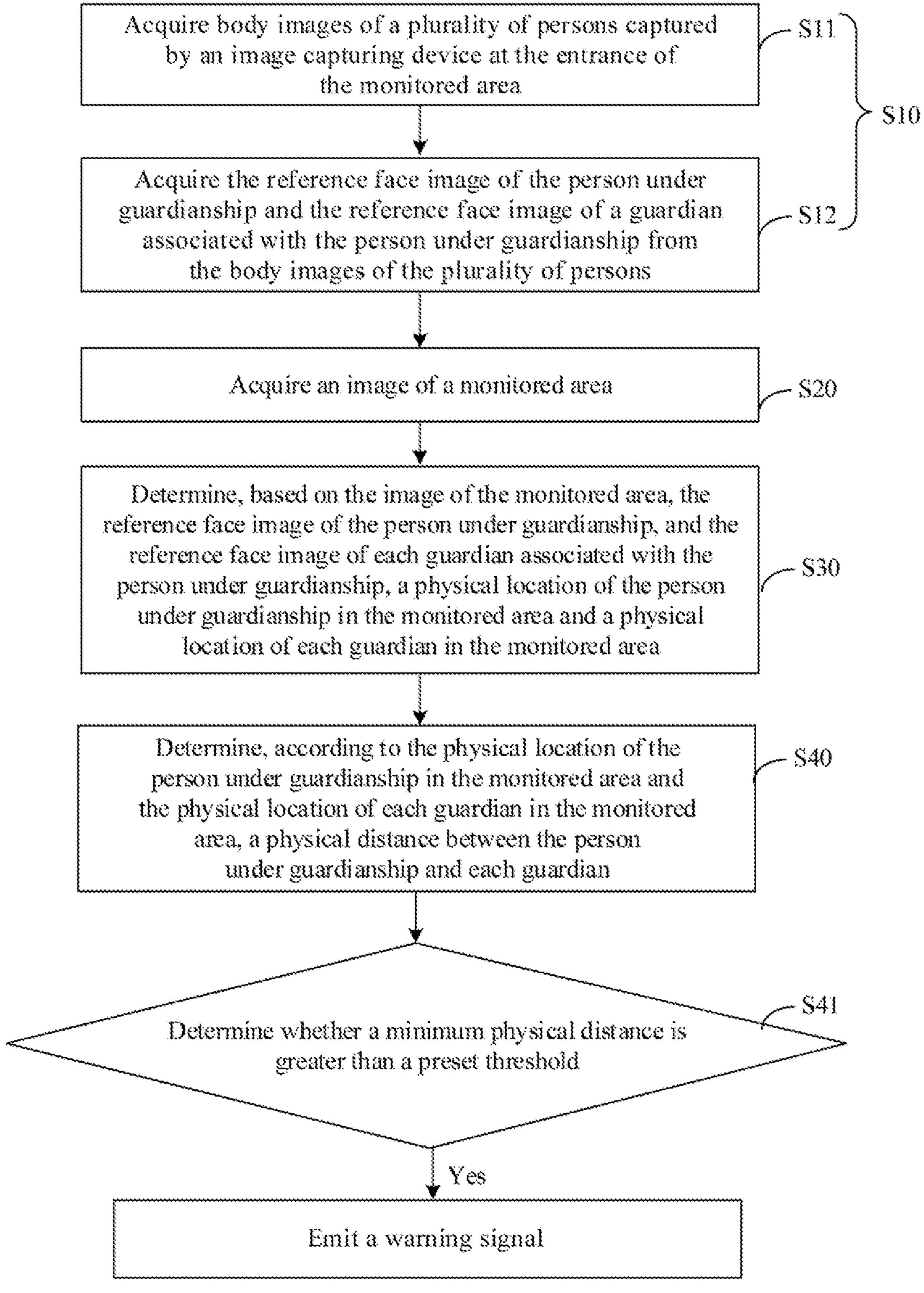
FIG. 3 is a schematic diagram of an anti-lost method according to some other embodiments of the present disclosure.

FIG. 3 is a schematic diagram of an anti-lost method according to some other embodiments of the present disclosure. As shown in FIG. 3, the anti-lost method includes the following steps.

Step S10 includes acquiring a reference face image of a person under guardianship and a reference face image of at least one guardian associated with the person under guardianship.

Optionally, Step S10 may specifically include the following Steps S11 to S12.

Step S11 includes acquiring body images of a plurality of persons at an entrance of the monitored area. The body images of the plurality of persons may be captured by an image capturing device at the entrance and then uploaded to a cloud server.

Step S12 includes acquiring the reference face image of the person under guardianship and the reference face image of at least one guardian associated with the person under guardianship from the body images of the plurality of persons.

Figure 4:
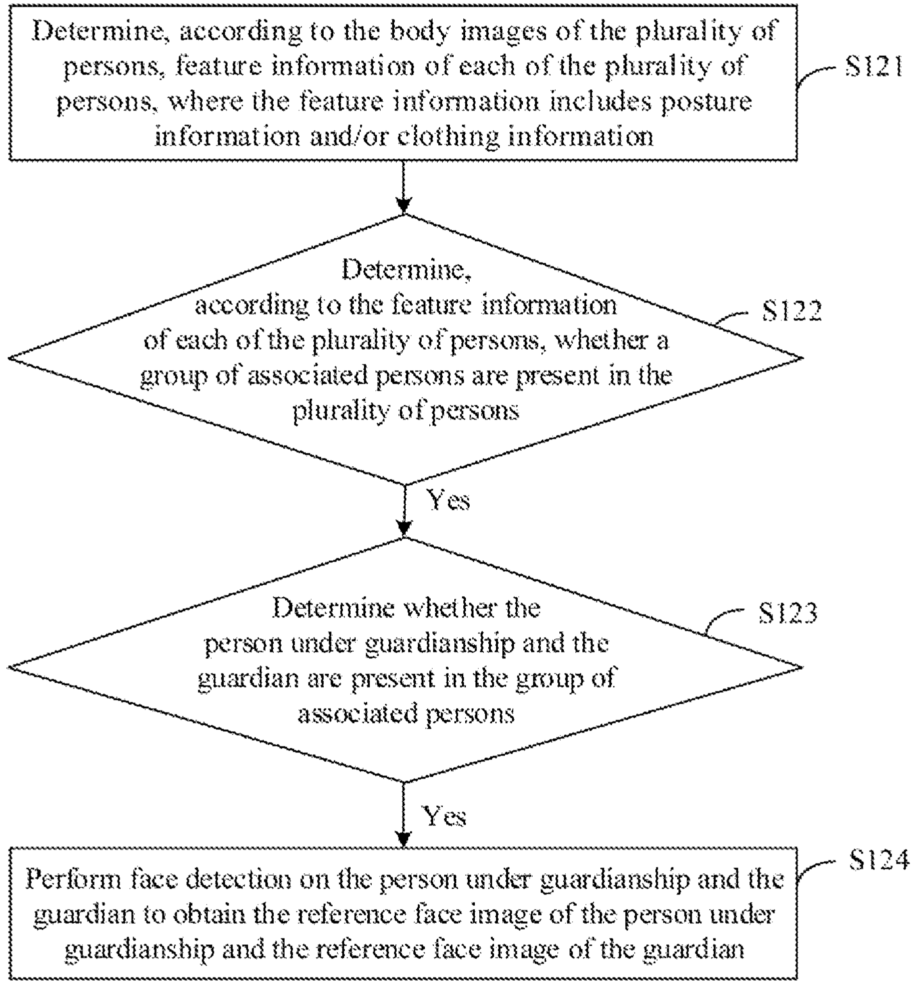
FIG. 4 is a flowchart of an alternative implementation of step S12 according to some embodiments of the present disclosure.

FIG. 4 is a flowchart of an alternative implementation of Step S12 according to some embodiments of the present disclosure. As shown in FIG. 4, Step S12 may specifically include Steps S121 to S124.

Step S121 includes determining, according to the body images of the plurality of persons, feature information of each of the plurality of persons, where the feature information includes posture information and/or clothing information.

Step S122 includes determining, according to the feature information of each of the plurality of persons, whether a group of associated persons are present among the plurality of persons.

For example, at least two persons close to each other (e.g., within 1 m from each other) wearing similar clothes (e.g., parent-child clothing) are determined as a group of associated persons. For another example, at least two persons close to each other having a particular posture (e.g., hand-in-hand posture or child-holding posture) are determined as a group of associated persons.

Step S123 includes determining, when a group of associated persons are present among the plurality of persons, whether the person under guardianship and the guardian are present among the group of associated persons.

Optionally, persons in the group of associated persons may be clustered to determine a category (e.g., elderly, young, children) to which each person belongs, and whether the person under guardianship and the guardian are present among the group of associated persons at the same time is determined according to the category to which each person belongs. For example, if it is determined that one child and one young are present in the group of associated persons, it is determined that the child is a person under guardianship and the young is a guardian; and if it is determined that one child and two young persons are present in the group of associated persons, it is determined that the child is a person under guardianship and each of the two young persons is a guardian.

Step S124 includes performing, when the person under guardianship and the guardian are present in the group of associated persons, face detection on the person under guardianship and the guardian is performed to obtain the reference face image of the person under guardianship and the reference face image of the guardian.

After Step S10, the method further includes the following Steps S20 to S41.

Step S20 includes acquiring an image of a monitored area.

Step S30 includes determining, based on the image of the monitored area, the reference face image of the person under guardianship, and the reference face images of guardians each associated with the person under guardianship, a physical location of the person under guardianship in the monitored area and a physical location of each guardian in the monitored area.

Step S30 may specifically include the above Steps S31 to S34, which are not repeated here.

Step S40 includes determining, according to the physical location of the person under guardianship in the monitored area and the physical location of each guardian in the monitored area, a physical distance between the person under guardianship and each guardian.

Step S41 includes determining whether a minimum physical distance is greater than a preset threshold, and emitting a warning signal if the minimum physical distance is greater than the preset threshold.

The warning signal may be sent to a mobile terminal of the guardian from the cloud server, or may be sent in other forms, such as sent as a broadcast.

Figure 5:
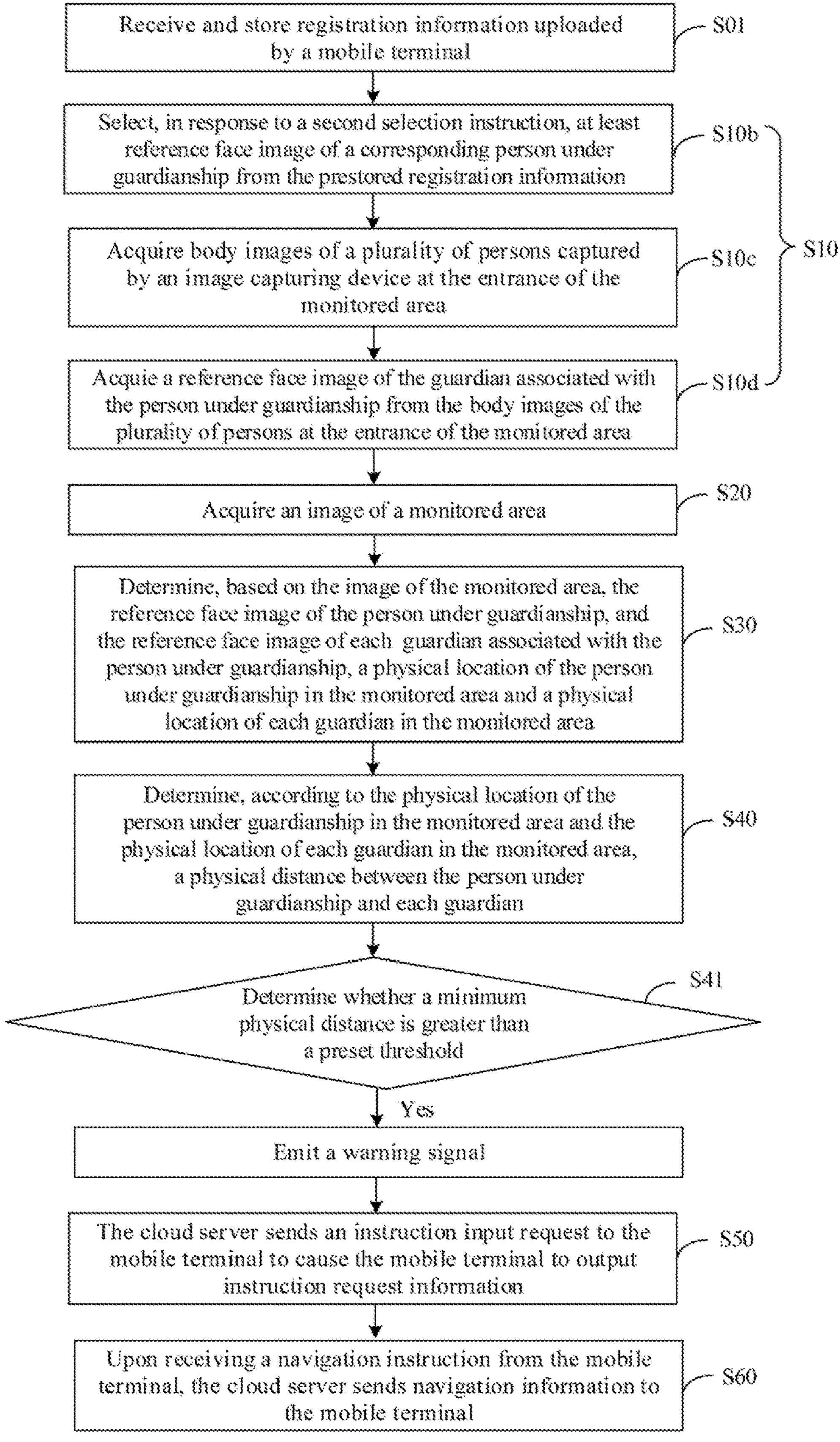
FIG. 5 is a flowchart of an anti-lost method according to yet some other embodiments of the present disclosure.

FIG. 5 is a flowchart of an anti-lost method according to yet some other embodiments of the present disclosure. As shown in FIG. 5, the anti-lost method includes the following steps.

Step S01 includes receiving and storing registration information uploaded by a mobile terminal. The registration information includes: reference face images of a plurality of persons. The plurality of persons may include a guardian and a person under guardianship. The reference face image of each person in the registration information may include: a recent face image of each person.

Step S10 includes acquiring a reference face image of a person under guardianship and a reference face image of at least one guardian associated with the person under guardianship. Optionally, Step S10 may specifically include the following steps S10*b* to S10*d*.

Step S10*b* includes selecting, in response to a second selection instruction, at least reference face image of a corresponding person under guardianship from the prestored registration information.

The user may select at least the person under guardianship to be monitored on the mobile terminal, and the mobile terminal generates the second selection instruction according to the selection of the user and uploads the second selection instruction to the cloud server. The cloud server, according to the second selection instruction, selects the reference face image of the corresponding person under guardianship from a storage module.

Step S10*c* includes acquiring body images of a plurality of persons at an entrance of the monitored area. The body images of the plurality of persons may be captured by an image capturing device at the entrance and then uploaded to the cloud server.

Step S10*d* includes acquiring, according to the reference face image of the person under guardianship, a reference face image of the guardian associated with the person under guardianship from the body images of the plurality of persons at the entrance of the monitored area.

Optionally, Step S10*d* may include the following Steps S101*d* to S103*d*.

Step S101*d* includes determining, according to the reference face image of the person under guardianship and the body images of the plurality of persons, feature information of the person under guardianship and feature information of each of the plurality of persons. The feature information includes posture information and/or clothing information.

For example, after the reference face image of the person under guardianship is obtained according to the second selection instruction, each face image acquired at the entrance of the monitored area is compared with the reference face image of the person under guardianship, so as to determine which face image acquired at the entrance of the monitored area belongs to the person under guardianship, and thus determine a body image of the person under guardianship (for example, the body image having a largest overlapping area with the face image of the person under guardianship is the body image of the person under guardianship).

Step S102*d* includes acquiring, according to the feature information of the person under guardianship and the feature information of each of the plurality of persons, a group of associated persons at the entrance of the monitored area. The group of associated persons includes the person under guardianship and the guardian.

For example, a person close to and wearing similar clothes (e.g., parent-child clothing) to the person under guardianship (e.g., within 1 m) is determined to in a group of associated persons with the person under guardianship. For another example, a person close to the person under guardianship and in a specific posture (for example, hand in hand with the person under guardianship) is determined to in a group of associated persons with the person under guardianship.

Step S103*d* includes acquiring a face image of each guardian in the group of associated persons as the reference face image of each guardian.

Step S20 includes acquiring an image of a monitored area.

Step S30 includes determining, based on the image of the monitored area, the reference face image of the person under guardianship, and the reference face image of the associated guardian, a physical location of the person under guardianship in the monitored area and a physical location of the guardian in the monitored area.

Step S30 may specifically include the above steps S31 to S34, which are not repeated here.

Step S40 includes determining, according to the physical location of the person under guardianship in the monitored area and the physical location of each guardian in the monitored area, a physical distance between the person under guardianship and each guardian.

Step S41 includes determining whether a minimum physical distance is greater than a preset threshold, and emitting a warning signal if the minimum physical distance is greater than the preset threshold.

The warning signal may be sent to a mobile terminal of the guardian from the cloud server.

In some embodiments, after Step S41, the method further includes the following Steps S50 to S60.

At Step S50, the cloud server sends an instruction input request to the mobile terminal to request the mobile terminal to send a navigation instruction or an abandon instruction. Upon receiving the instruction input request from the cloud server, the mobile terminal outputs an instruction request signal to request a user to input the navigation instruction or the abandon instruction.

At Step S60, upon receiving the navigation instruction from the mobile terminal, the cloud server sends navigation information to the mobile terminal. The navigation information includes route information between the person under guardianship and the guardian so that the user can quickly find the person under guardianship according to the navigation information. When the cloud server receives the abandon instruction from the mobile terminal, the navigation information is not sent.

An embodiment of the present disclosure further provides a computer-readable storage medium having a computer program stored thereon which, when executed by a processor, causes the anti-lost method according to any of the above embodiments to be implemented.

An embodiment of the present disclosure further provides a cloud server, including a memory and a processor. The memory has a computer program stored thereon which, when executed by the processor, causes the anti-lost method according to any of the above embodiments to be implemented.

The memory and the computer-readable storage medium described above include, but are not limited to: a random access memory (RAM), a read only memory (ROM), a non-volatile random access memory (NVRAM), a programmable read only memory (PROM), an erasable programmable read only memory (EPROM), an electrically erasable programmable read only memory (EEPROM), a flash memory, a magnetic or optical data memory, a register, a magnetic disc or tape, an optical storage medium such as a compact disc (CD) or a DVD (digital versatile disc), and other non-transitory media. Examples of the processor include, but are not limited to, general purpose processors, central processing units (CPUs), microprocessors, digital signal processors (DSPs), controllers, microcontrollers, state machines, and the like.

Figure 6:
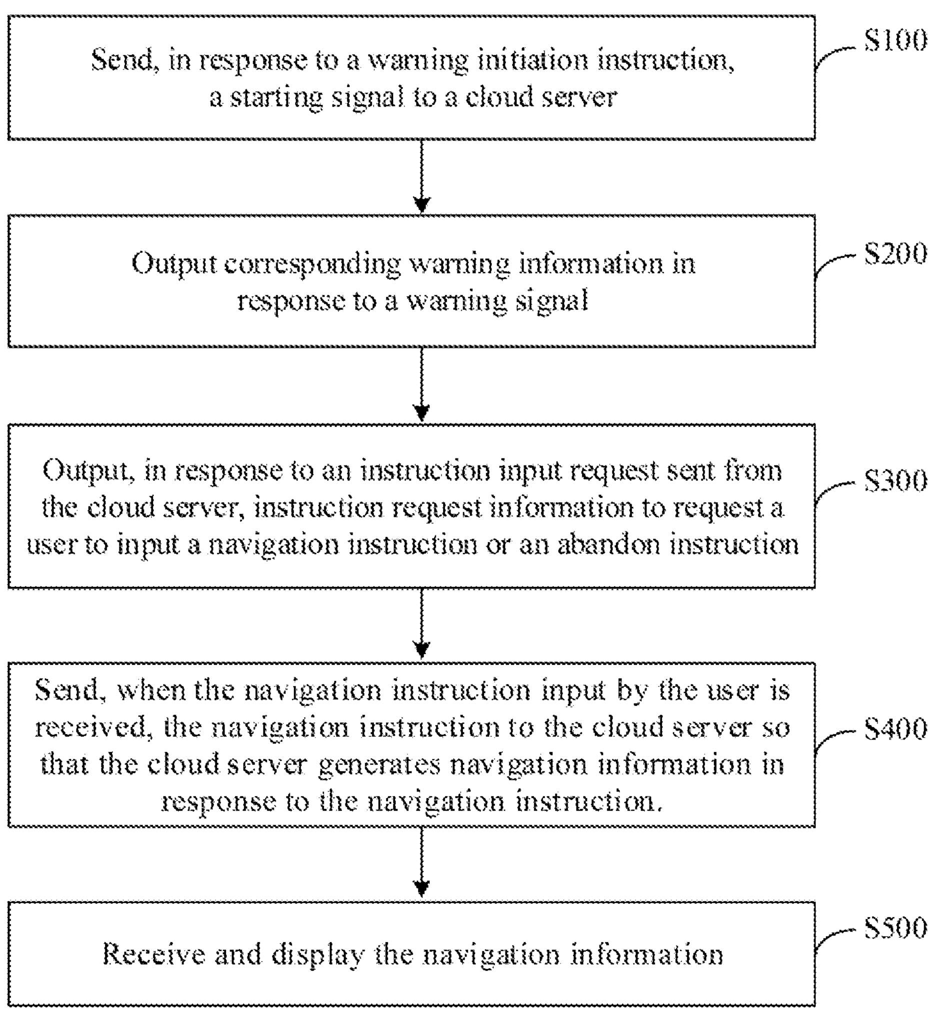
FIG. 6 shows a schematic diagram of the steps implemented when a computer program in a mobile terminal is executed by a processor.

An embodiment of the present disclosure further provides a mobile terminal which may be a mobile phone, a tablet, or the like. The mobile terminal includes a memory and a processor. The memory has a computer program stored thereon. FIG. 6 shows a schematic diagram of the steps implemented when a computer program on a mobile terminal is executed by a processor. As shown in FIG. 6, the computer program, when executed by the processor, causes the following Steps S100 to S200 to be implemented.

Step S100 includes sending, in response to a warning initiation instruction, a starting signal to a cloud server so that the cloud server, in response to the starting signal, implements the anti-lost method according to any one of the above embodiments. The warning initiation instruction is an instruction input by a user (a guardian about to enter the monitored area) to the mobile terminal.

Step S200 includes outputting corresponding warning information in response to the warning signal.

After the cloud server sends the warning signal, the mobile terminal outputs corresponding warning information in response to the warning signal, to alert that the user (i.e., the guardian) currently has a relatively large distance to the person under guardianship.

In some embodiments, the computer program stored in the mobile terminal, when executed by the processor, further causes the following Steps S300 to S500 to be implemented.

Step S300 includes outputting, in response to an instruction input request sent from the cloud server, instruction request information to request a user to input the navigation instruction or the abandon instruction.

Illustratively, the instruction request information is output in a text form and/or a speech form. For example, the instruction request information is “Do you need navigation?”.

Step S400 includes sending, when the navigation instruction input by the user is received, the navigation instruction to the cloud server so that the cloud server generates navigation information in response to the navigation instruction.

Step S500 includes receiving and displaying the navigation information so that the user can quickly find the person under guardianship according to the navigation information.

In some embodiments, the computer program stored in the mobile terminal, when executed by the processor, further causes the following Step S001.

Step S001 includes acquiring registration information and uploading the registration information to the cloud server so that the cloud server stores the registration information. The registration information includes: identity information of a plurality of persons. The identity information of each person includes: a reference face image, and further information such as an ID number, a telephone number, and a name.

For example, a user (who may be a holder of the mobile terminal and also a guardian) firstly registers as an administrator on the mobile terminal, during which identity information of the user himself/herself, such as a name, an ID number, a telephone number, a reference face image, or the like, may be input. The user may further add the identity information of the person under guardianship, such as a name, an ID number and a reference face image into the mobile terminal. The mobile terminal uploads the registration information (i.e., identity information of the guardian and the person under guardianship) to a storage module of the cloud server for storage.

It should be noted that the registration information may include reference face images of a plurality of guardians. For example, after the user registers as an administrator on the mobile terminal, in addition to the identity information of the person under guardianship, identity information of other guardians may be added. In addition, the user as the administrator may further manage, for example, delete, the identity information of each person as added.

Figure 7:
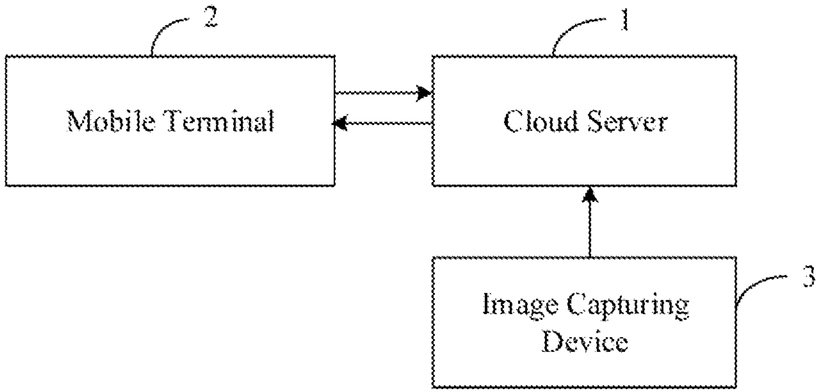
FIG. 7 is a schematic diagram of an anti-lost system according to some embodiments of the present disclosure.

An embodiment of the present disclosure further provides an anti-lost system. FIG. 7 is a schematic diagram of an anti-lost system according to some embodiments of the present disclosure. As shown in FIG. 7, the anti-lost system includes the cloud server 1 as described above and the mobile terminal 2 as described above. The cloud server 1 is in communicative coupled to the mobile terminal, and in addition, the cloud server 1 may further establish communicative connection with an image capturing device 3 in a monitored area, so that images of the monitored area captured by the image capturing device 3 and images at an entrance of the monitored area are acquired.

With the anti-lost system in the embodiments of the present disclosure, when a physical distance between the person under guardianship and the guardian is large, the cloud server can send a warning signal to the mobile terminal to alert the guardian, thereby reducing the loss probability of the person under guardianship, and the person under guardianship does not need to wear any device.

It will be appreciated that the above implementations are merely exemplary implementations for the purpose of illustrating the principle of the present disclosure, and the present disclosure is not limited thereto. Various modifications and improvements can be made by a person having ordinary skill in the art without departing from the protection scope of the disclosure defined in the accompany claims, and accordingly, all of these modifications and improvements fall within the protection scope of the present disclosure.

What is claimed is:

1. An anti-lost method, comprising:

acquiring a reference face image of a person under guardianship and a reference face image of at least one guardian associated with the person under guardianship;

acquiring an image of a monitored area;

determining, based on the image of the monitored area, the reference face image of the person under guardianship, and the reference face image of the at least one guardian, physical locations of the person under guardianship and the at least one guardian in the monitored area;

determining, according to the physical locations of the person under guardianship and the at least one guardian in the monitored area, a physical distance between the person under guardianship and each of the at least one guardian, and determining whether a minimum physical distance is greater than a preset threshold; and emitting a warning signal in a case where the minimum physical distance is larger than the preset threshold, wherein the acquiring the reference face image of the person under guardianship and the reference face image of the at least one guardian associated with the person under guardianship comprises:

acquiring body images of a plurality of persons at an entrance of the monitored area; and acquiring the reference face image of the person under guardianship and the reference face image of the at least one guardian associated with the person under guardianship from the body images of the plurality of persons.

2. The anti-lost method according to claim 1, wherein the determining, based on the image of the monitored area, the reference face image of the person under guardianship, and the reference face image of the at least one guardian, physical locations of the person under guardianship and the at least one guardian in the monitored area comprises:

performing face detection on the image of the monitored area to obtain face image of each person in the monitored area;

determining, according to the face image of each person in the monitored area, the reference face image of the person under guardianship and the reference face image of the at least one guardian, whether the person under guardianship and the guardian are present in the monitored area;

acquiring, in a case where the person under guardianship and the guardian are present in the monitored area, body external frames of the person under guardianship and the guardian; and determining, according to image positions of the body external frames of the person under guardianship and the guardian in the image of the monitored area, physical locations of the guardian and the person under guardianship in the monitored area.

3. The anti-lost method according to claim 2, wherein the acquiring the body external frames of the person under guardianship and the at least one guardian comprises:

performing body detection on the image of the monitored area to obtain a body external frame of each person in the monitored area;

taking a body external frame having a largest overlapping area with a face frame of the person under guardianship as the body external frame of the person under guardianship; and for the at least one guardian, taking a body external frame having a largest overlapping area with a face frame of the guardian as the body external frame of the guardian.

4. The anti-lost method according to claim 1, wherein the acquiring the reference face image of the person under guardianship and the reference face image of the at least one guardian associated with the person under guardianship from the body images of the plurality of persons comprises:

determining, according to the body images of the plurality of persons, feature information of each of the plurality of persons, wherein the feature information comprises posture information and/or clothing information;

determining, according to the feature information of each of the plurality of persons, whether a group of associated persons are present in the plurality of persons;

determining, in a case where the group of associated persons are present in the plurality of persons, whether the person under guardianship and the at least one guardian are present in the group of associated persons; and performing, in a case where the person under guardianship and the at least one guardian are present in the group of associated persons, face detection on the person under guardianship and the at least one guardian to obtain the reference face image of the person under guardianship and the reference face image of the at least one guardian.

5. The anti-lost method according to claim 1, wherein before acquiring the reference face image of the person under guardianship and the reference face image of the at least one guardian associated with the person under guardianship, the method further comprises: receiving and storing registration information uploaded by a mobile terminal, wherein the registration information comprises: reference face images of a plurality of persons; and the acquiring the reference face image of the person under guardianship and the reference face image of at least one guardian associated with the person under guardianship comprises: selecting, in response to a first selection instruction, reference face images of a corresponding person under guardianship and at least one guardian associated with the person under guardianship from the prestored registration information.

6. The anti-lost method according to claim 5, wherein the warning signal is sent to the mobile terminal.

7. The anti-lost method according to claim 5, wherein after emitting the warning signal, the anti-lost method further comprises:

sending an instruction input request to the mobile terminal to cause the mobile terminal to output instruction request information, wherein the instruction request information is configured to request a user to input a navigation instruction or an abandon instruction;

sending, in a case where the navigation instruction is received, navigation information to the mobile terminal; wherein the navigation information comprises route information between the person under guardianship and the guardian.

8. The anti-lost method according to claim 1, wherein before acquiring the reference face image of the person under guardianship and the reference face image of the at least one guardian associated with the person under guardianship, the method further comprises: receiving and storing registration information uploaded by a mobile terminal, wherein the registration information comprises: reference face images of a plurality of persons;

the acquiring the reference face image of the person under guardianship and the reference face image of the at least one guardian associated with the person under guardianship comprises:

selecting, in response to a second selection instruction, at least reference face image of a corresponding person under guardianship from the prestored registration information;

acquiring body images of a plurality of persons at an entrance of the monitored area; and acquiring, according to the reference face image of the person under guardianship, the reference face image of the at least one guardian associated with the person under guardianship from the body images of the plurality of persons acquired at the entrance of the monitored area.

9. The anti-lost method according to claim 8, wherein the acquiring, according to the reference face image of the person under guardianship, the reference face image of the at least one guardian associated with the person under guardianship from the body images of the plurality of persons acquired at the entrance of the monitored area comprises:

determining, according to the reference face image of the person under guardianship and the body images of the plurality of persons, feature information of the person under guardianship and feature information of each of the plurality of persons, wherein the feature information comprises posture information and/or clothing information;

acquiring, according to the feature information of the person under guardianship and the feature information of each of the plurality of persons, a group of associated persons at the entrance of the monitored area, wherein the group of associated persons comprises the person under guardianship and the at least one guardian; and acquiring a face image of the at least one guardian in the group of associated persons as the reference face image of the at least one guardian.

10. The anti-lost method according to claim 1, wherein the preset threshold is related to a crowd density in the monitored area.

11. A non-transitory computer-readable storage medium having a computer program stored thereon which, when executed by a processor, causes the anti-lost method according to claim 1 to be implemented.

12. A cloud server, comprising a memory and a processor, wherein the memory has a computer program stored thereon which, when executed by the processor, causes the anti-lost method according to claim 1 to be implemented.

13. A mobile terminal, comprising a memory and a processor, wherein the memory has a computer program stored thereon which, when executed by the processor, causes the following steps to be implemented:

sending, in response to a warning initiation instruction, a starting signal to a cloud server so that the cloud server, in response to the starting signal, implements the anti-lost method according to claim 1; and outputting corresponding warning information in response to the warning signal.

14. The mobile terminal according to claim 13, wherein when executed by the processor, the computer program further causes the following step to be implemented:

acquiring registration information and uploading the registration information to the cloud server; wherein the registration information comprises: reference face images of a plurality of persons.

15. The mobile terminal according to claim 13, wherein when executed by the processor, the computer program further causes the following steps to be implemented:

outputting, in response to an instruction input request sent from the cloud server, instruction request information to request a user to input a navigation instruction or an abandon instruction;

sending, when the navigation instruction is received, the navigation instruction to the cloud server so that the cloud server generates navigation information in response to the navigation instruction; and receiving and displaying the navigation information.

16. An anti-lost system, comprising: a cloud server and a mobile terminal, wherein the mobile terminal comprises a memory and a processor, wherein the memory has a computer program stored thereon which, when executed by the processor, causes the following steps to be implemented:

sending, in response to a warning initiation instruction, a starting signal to a cloud server so that the cloud server, in response to the starting signal, implements the anti-lost method according to claim 1; and outputting corresponding warning information in response to the warning signal.

17. An anti-lost method, comprising:

acquiring a reference face image of a person under guardianship and a reference face image of at least one guardian associated with the person under guardianship;

acquiring an image of a monitored area;

determining, based on the image of the monitored area, the reference face image of the person under guardianship, and the reference face image of the at least one guardian, physical locations of the person under guardianship and the at least one guardian in the monitored area;

determining, according to the physical locations of the person under guardianship and the at least one guardian in the monitored area, a physical distance between the person under guardianship and each of the at least one guardian, and determining whether a minimum physical distance is greater than a preset threshold; and emitting a warning signal in a case where the minimum physical distance is larger than the preset threshold, wherein the determining, based on the image of the monitored area, the reference face image of the person under guardianship, and the reference face image of the at least one guardian, physical locations of the person under guardianship and the at least one guardian in the monitored area comprises:

performing face detection on the image of the monitored area to obtain face image of each person in the monitored area;

determining, according to the face image of each person in the monitored area, the reference face image of the person under guardianship and the reference face image of the at least one guardian, whether the person under guardianship and the guardian are present in the monitored area;

acquiring, in a case where the person under guardianship and the guardian are present in the monitored area, body external frames of the person under guardianship and the guardian; and determining, according to image positions of the body external frames of the person under guardianship and the guardian in the image of the monitored area, physical locations of the guardian and the person under guardianship in the monitored area.

18. An anti-lost method, comprising:

acquiring a reference face image of a person under guardianship and a reference face image of at least one guardian associated with the person under guardianship;

acquiring an image of a monitored area;

determining, based on the image of the monitored area, the reference face image of the person under guardianship, and the reference face image of the at least one guardian, physical locations of the person under guardianship and the at least one guardian in the monitored area;

determining, according to the physical locations of the person under guardianship and the at least one guardian in the monitored area, a physical distance between the person under guardianship and each of the at least one guardian, and determining whether a minimum physical distance is greater than a preset threshold; and emitting a warning signal in a case where the minimum physical distance is larger than the preset threshold, wherein before acquiring the reference face image of the person under guardianship and the reference face image of the at least one guardian associated with the person under guardianship, the method further comprises: receiving and storing registration information uploaded by a mobile terminal, wherein the registration information comprises: reference face images of a plurality of persons; and the acquiring the reference face image of the person under guardianship and the reference face image of at least one guardian associated with the person under guardianship comprises: selecting, in response to a first selection instruction, reference face images of a corresponding person under guardianship and at least one guardian associated with the person under guardianship from the prestored registration information.

* * * * *